Aug. 22, 1967 — C. O. SCOTT — 3,337,164
AIRCRAFT SAFETY BODY
Filed May 10, 1965 — 4 Sheets-Sheet 1

INVENTOR
Clifford O. Scott
BY [signature]
ATTY.

Aug. 22, 1967

C. O. SCOTT 3,337,164

AIRCRAFT SAFETY BODY

Filed May 10, 1965

INVENTOR
Clifford O. Scott
BY *Walter S. Murray*
ATTY.

Aug. 22, 1967  C. O. SCOTT  3,337,164
AIRCRAFT SAFETY BODY
Filed May 10, 1965  4 Sheets-Sheet 3

INVENTOR
Clifford O. Scott
BY [signature]
ATTY.

INVENTOR.
Clifford O. Scott
BY
ATTY.

United States Patent Office 3,337,164
Patented Aug. 22, 1967

3,337,164
AIRCRAFT SAFETY BODY
Clifford O. Scott, 4015 Kittyhawk Drive,
Dayton, Ohio 45403
Filed May 10, 1965, Ser. No. 454,372
3 Claims. (Cl. 244—119)

ABSTRACT OF THE DISCLOSURE

Aircraft fuselage and passenger deck construction which cooperate under crash conditions to provide gradual and safe deceleration of personnel and passengers within the aircraft body.

---

The present invention relates to improvements in fuselage structures and is particularly directed to economies in the manufacture of aircraft bodies and to crash safety features incorporated in such structures.

A principal object of the invention is to provide an improved aircraft body structure capable of withstanding compressive stresses in an improved manner throughout its length and which has an inherently stronger design by reason of the utilization of a long, continuous, one-piece rib construction that eliminates much of the present connecting and jointure of many individual fuselage ring and bulkhead subassemblies.

Another object of the invention is to provide a safety aircraft body having the foregoing characteristics wherein the personnel, passenger and cargo arrangements and structures cooperate with my improved fuselage, in case of sudden and accidental stops, to secure a gradual and safe deceleration of personnel and passengers within said aircraft body by mechanical and pneumatic means.

A further object of this invention is to provide an aircraft body structure adaptable to machine tool fabrication that will substantially lower present-day labor costs and shorten the overall time required in the fabrication of these body structures, while producing a stronger, safer and a more uniformly constructed aircraft body.

A still further object of this invention is to provide an improved fabricating method for the production of fuselage structures having the foregoing characteristics.

Other objects and features of the invention will be readily understood from the following detailed description of typical and preferred forms of my invention taken in conjunction with the accompanying drawings wherein like reference numerals indicate identical parts throughout the several views and in which.

Figure 1:
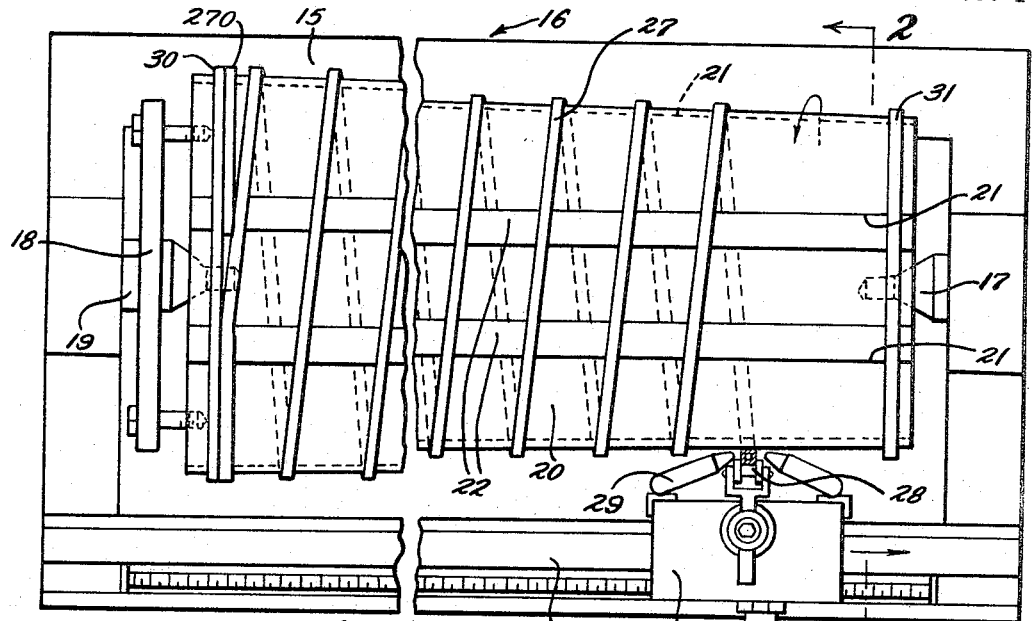
FIG. 1 is a fragmental, top plan view of my improved fuselage shown in an intermediate stage of its fabrication.
Figure 2:
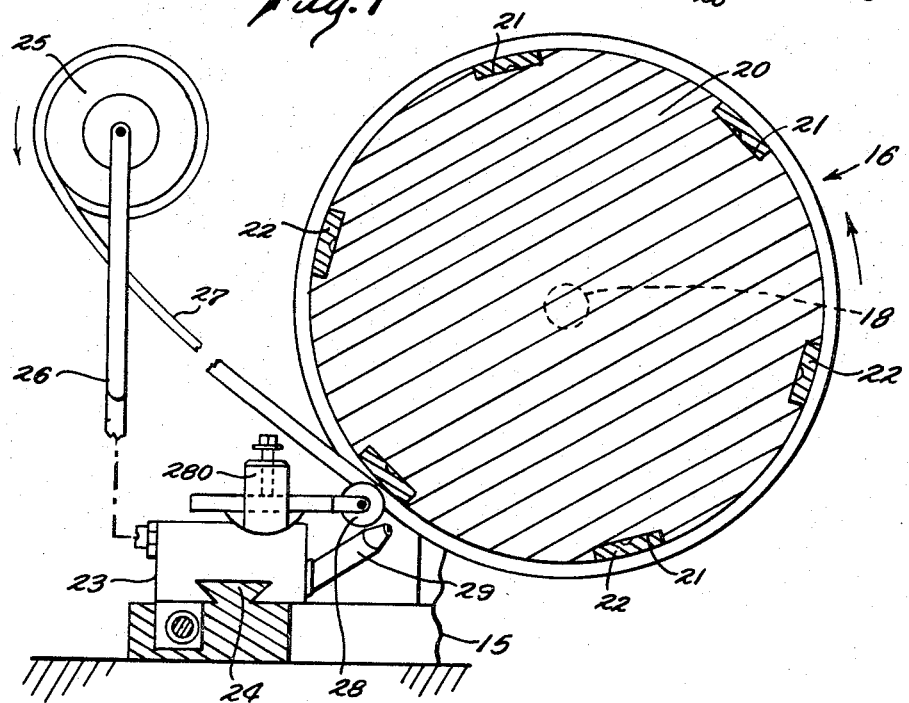
FIG. 2 is a fragmental, enlarged section taken on line 2—2 of FIG. 1.

With reference to FIGS. 1 and 2 of the drawings, the numeral 15 indicates the base of a relatively large machine tool 16, said base supporting at one end a tail stock 17 and having a head stock 18 mounted on its opposed end. The head stock is rotatably mounted on a shaft 19 that is driven by a suitable source of power (not shown). A mandrel 20 having a straight or a slightly truncated cone shaped configuration is mounted for rotation on its axis between the tail and head stocks and has a number of angularly spaced apart, longitudinally extending through manufacturing slots or recesses 21 formed in its exterior surface to receive and temporarily hold a number of fuselage longerons 22. The machine base has mounted thereon a carriage 23 which is driven by a well known transversing mechanism along a longitudinal slide 24 in predetermined timed relation with the rotation of the mandrel 20. As best shown in FIG. 2 the carriage preferably carries a rib spool 25 on a bracket 26 projecting upwardly from the rest, said spool having approximately the same diameter as the mandrel 20 in order that the coiled rib material 27 thereon may be pre-stressed and pre-formed and may be fed therefrom onto the mandrel without bending thereof which might otherwise weaken the stock.

The carriage has a grooved roller 28 mounted in its tool post 280 for lateral adjustment thereon and adapted to feed and guide the rib 27 as it is wrapped onto the longeron carrying mandrel 20. As the rib initially engages each longeron the machine and welding heads 29 carried by the carriage are operated to attach, weld or braze the rib 27 to the longerons 22.

Figure 7:
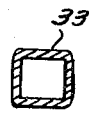
FIGS. 7, 8 and 9 are sectional views of various forms of ribs for my improved fuselage.
Figure 8:
Figure 9:
Figure 6:
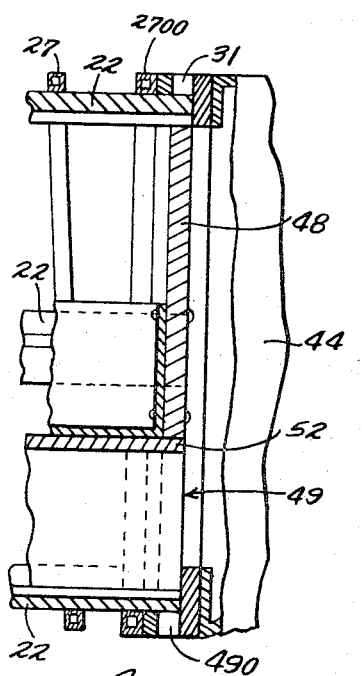
FIG. 6 is a section taken on line 6—6 of FIG. 4.

As best shown in FIG. 1 the longerons 22 are initially held in the slots 21 of the mandrel by section connecting rings 30 and 31 which encircle the longerons at each end and are welded to the said longerons in any suitable manner. The first coil 270 of the rib 27 fed onto the mandrel is welded to the side of the mounting ring 30 while the last full coil 2700 (FIG. 6) of the rib is welded to the opposed mounting ring 31. The rib stock may have any of a number of cross-sectional configurations which may include the square tube stock 33 shown in FIG. 7 of the drawings, the Z-shaped stock 34 shown in FIG. 8 of the drawings, or a double channel, I-beam form 35 shown in FIG. 9 of the drawings. The tube stock 33 may be utilized for radiant heating purposes, if desired; or for cooling, as required.

It will therefore be understood that I have provided a fuselage frame construction comprising a continuous coiled rib 27 extending the entire length of the fuselage section and welded to a number of angularly spaced apart longerons 22 at all points where the rib crosses the longerons. As has been specified the fuselage may be made on a large mandrel provided with elongated, outwardly opening slots which receive and position the longerons, said longerons being maintained in the slots by means of end rings which may comprise the bolted connecting means between fuselage sections in the finished aircraft body. After my fuselage structure has been completely welded together the fuselage may be skin wrapped and/or slid coaxially from the mandrel because the mandrel has a slight taper from one end to the other and once the longerons are axially displaced from their respective slots the fuselage may be readily removed axially from the mandrel.

Figure 3:
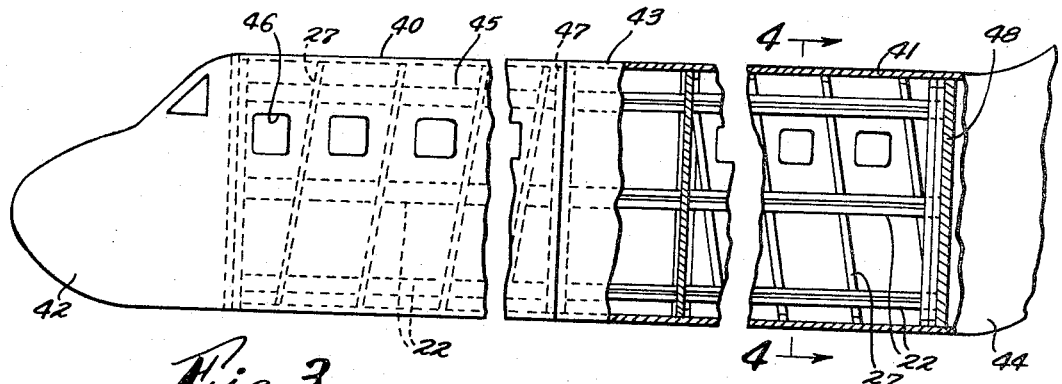
FIG. 3 is a fragmental, side elevational view of my fuselage structure incorporated in an assembled aircraft body, parts thereof being shown in central section.
Figure 4:
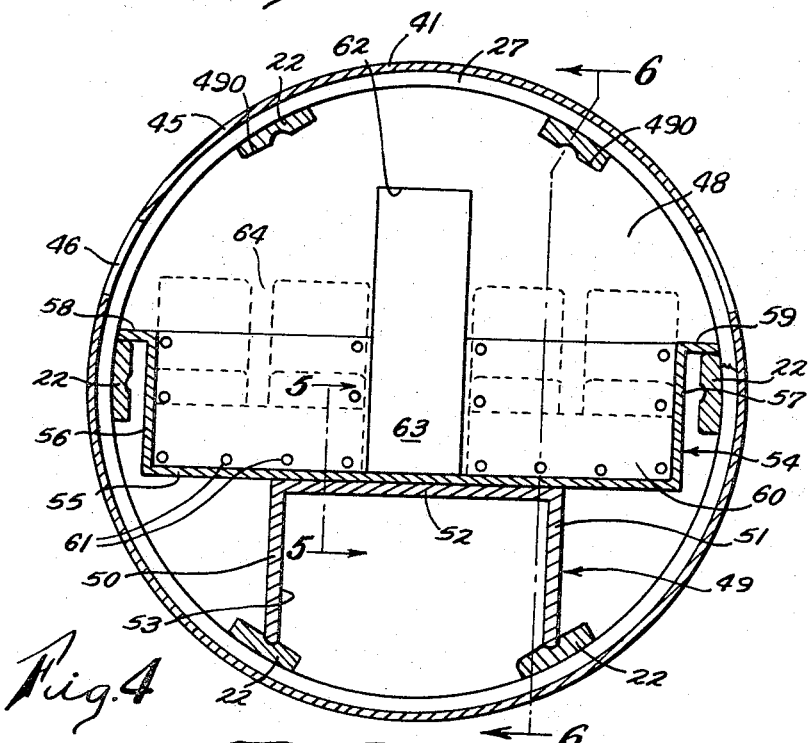
FIG. 4 is an enlarged section taken on line 4—4 of FIG. 3 showing my fuselage structure provided with one form of passenger arrangement.

Now with reference to FIGS. 3–6 of the drawing, there is illustrated in FIG. 3 a typical aircraft body with two of my fuselage frame sections incorporated therein and depicted in said figure by the reference numerals 40 and 41, said sections being employed in the aircraft body as passenger cabins. The small or forward end of the fuselage section 40 is secured to a cockpit bulkhead 42 whilst the adjacent, confronting ends of the sections 40 and 41 are preferably secured to a galley section 43; the rear end of the section 41 being connected to a tail section 44. The aircraft body is provided with a conventional skin 45 and the enclosed body may have the normal number of openings 46 for windows and doors for passenger and cargo entrance and exit. Each fuselage section 40 and 41 has at least an aft bulkhead 47 and 48, respectively, which have the same outside diameter as the outside diameter of the rib structure 27 (FIG. 6), and as shown in FIG. 4, each bulkhead is notched at 490 to freely receive the longerons 22.

Figure 5:
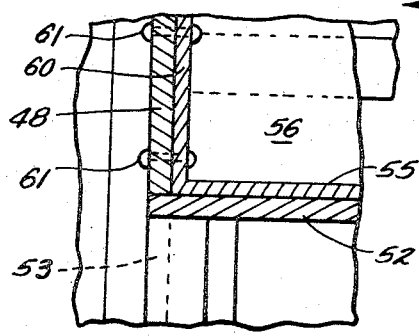
FIG. 5 is an enlarged section taken on line 5—5 of FIG. 4.

As sections 40 and 41 have substantially the same structure only section 41 will be fully described and with reference to FIG. 3, which depicts one form of the seating arrangement for my fuselage, the numeral 49 indicates a keel which extends at least the length of the fuselage section 41 and which has an inverted U-shape in lateral section, the legs 50 and 51 of the keel being mounted upon the lower longerons 22 as by welding or the like, to support their upper connecting flat portion 52 in a horizontal, fixed position within the fuselage. With reference to FIGS. 4 and 5 the bulkhead 48 is cut out at 53 to straddle the keel 49 and to be longitudinally movable thereover. A passenger deck 54 rests upon the flat supporting portion 52 of the keel and comprises a floor 55 extending the length of the fuselage section and having a width dimension nearly the width of the fuselage. This floor has integral, upstanding side sections 56 and 57 which terminate in upper and outwardly projecting flanges 58 and 59, respectively, that rest upon the side longerons 22. The floor is provided with at least an aft end wall 60 which is connected, as by bolts 61 to the bulkhead 48. As best shown in FIG. 4 the bulkhead may have a door opening 62 therein in alignment with an aisle 63 formed between rows 64 of the passenger seating arrangement carried wholly by the deck 54.

Figure 10:
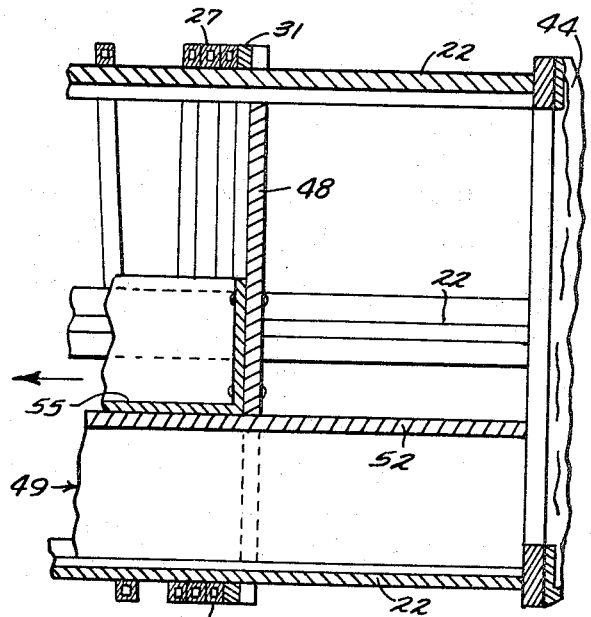
FIG. 10 is a fragmental, sectional view like FIG. 6 showing the parts in a post-collision condition.

It will therefore be seen that the passenger deck 54 is freely supported upon the keel 49 and on the longerons 22. The deck is also fastened to the aft bulkhead 48 which is free to move forwardly relative to the longerons 22 and the keel 49 but which has its peripheral portion projecting behind the continuous spiral rib 27. Upon a sudden stop being made by the aircraft such as stops caused by accident the deck 57 and its passengers would move forwardly relative to the fuselage at impact as shown in FIG. 10 of the drawing, such forward movement of the passengers being decelerated in a gradual manner by the aft bulkhead which will progressively compress the coiled rib and break each succeeding coil from its welded condition on the longerons, compress the galley and baggage sections, to gradually reduce the shock of impact and thereby increase passenger safety in said aircraft, by mechanical and pneumatic means.

Figure 11:
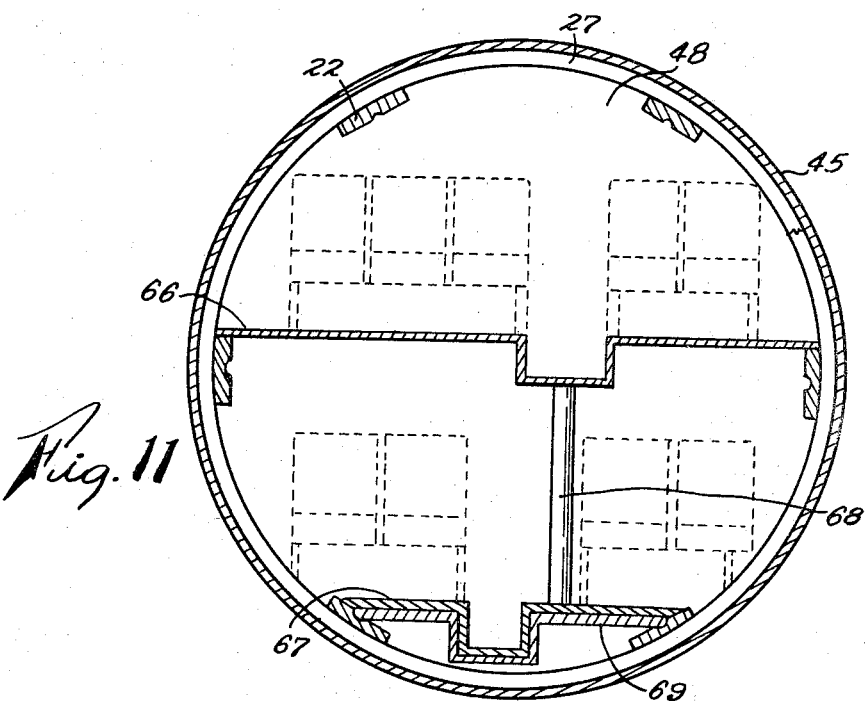
FIG. 11 is a sectional view like FIG. 4 showing a modification of the passenger arrangement for my fuselage.

There is shown in FIG. 11 a high density passenger seating arrangement having a double deck 66 and 67 connected together by posts 68 and slidably supported upon a fixed keel 69 in the manner described with reference to the aircraft section shown in FIG. 3. These decks are connected in any suitable manner to an aft bulkhead 48. Other modifications of the passenger seating arrangements and cargo carrying compartments may be made within the skill of the art, it being understood that in all such arrangements the continuous rib and its welded up structure with the longerons cooperate with the aft bulkhead attached to the floor and seating arrangement for cushioning the initial impact in case of accident.

Figure 12:
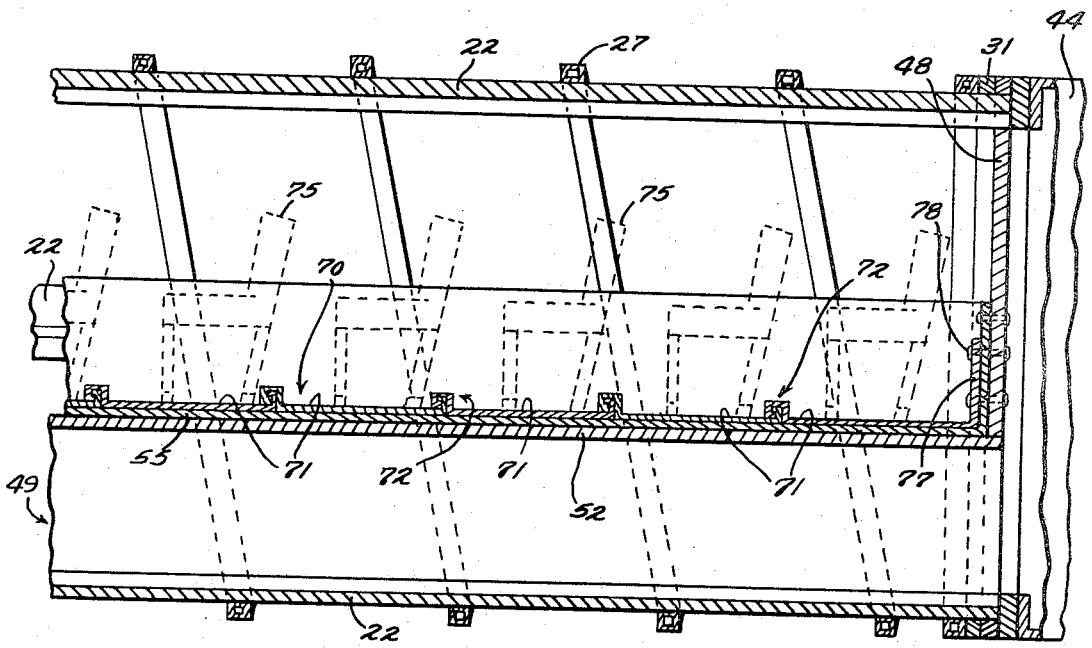
FIG. 12 is a view like FIG. 6 showing another modified form of my passenger arrangement.
Figure 13:
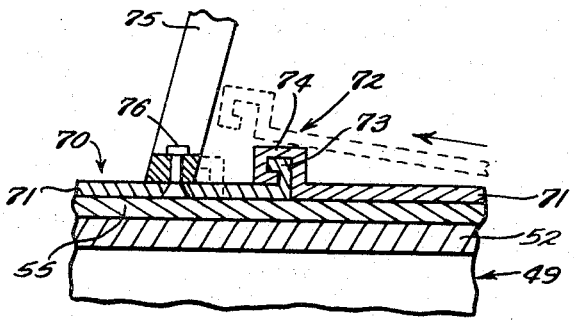
FIG. 13 is an enlarged sectional detail of the passenger arrangement shown in FIG. 12.

Now with respect to FIGS. 12 and 13 of the drawings there is depicted another modified form of a passenger seating arrangement which cooperates with my fuselage structure, the reference numeral 70 generally indicating a sectionalized floor which rests upon and is otherwise unconnected to the deck 52. The floor 70 comprises a number of articulated plates 71, adjacent plates being connected together by laterally extending crimped seams 72. As best shown in FIG. 13 the forward plate of any two adjacent plates in the articulated floor has an upwardly and forwardly projecting flange 73 formed thereon which is engaged by an upwardly and rearwardly projecting flange 74, said flanges being clinched together by compressive forces. The length of each floor plate 71 should be equal to the seating pitch so that one row of seats 75 will be secured as by bolts 76 to each plate. The rearmost plate in the sectionalized floor 70 is flanged upwardly at 77 and bolted at 78 to the bulkhead 48. Upon longitudinal collapse of the fuselage caused by a sudden and accidental stop, or the like, the sectionalized flooring would be initially placed in tension which would cause the bulkhead 48 to move forward progressively severing the rib 27 and longeron 22 welds and compressing the fuselage. Continued forward movement of the bulkhead will cause the clinched connections 72 of the flooring to be severed beginning with the foremost clinched connection and continuing rearwardly in a progressive manner depending on the force of impact. As each clinched connection is severed its rearmost plate will ride up on the rear support of the seat arrangement (FIG. 13) in front of it causing the seat arrangement and passengers thereon to assume a reclining position and to move upon the armrests on the seating arrangement next rearwardly therefrom thus cushioning the impact of the accidental stop and securing an additional safety factor for my fuselage.

It will therefore be understood that my invention produces a fast and simplified process for the fabrication of cylindrically shaped frames, such as an airplane fuselage, or the like, by the use of machine tools thus eliminating many hours of needless work, tools and fixtures and producing, with fewer joints, a long shape inherently capable of reducing deceleration of passengers and cargo under crash conditions by attachment of a loose flooring to the aft bulkhead, said bulkhead being adapted to strip the coils of a continuous rib from the longerons, compress the coils and pneumatically stop the cabins after impact, against the forward bulkhead behind the pilot's compartment.

My design eliminates one galley or buffet section, reduces personnel, allows lavatories to be placed separate from the buffet, permits increase in fuselage length and utilizes buffet and baggage compartments as expendable, compressible factors on impact.

For high density passenger seating the capacity can be doubled by both of the decks (FIG. 11) riding on the keel and both attached to the aft bulkhead to retain all the safety features of my invention.

What is claimed is:

1. In a fuselage section the combination of a plurality of longitudinally extending, laterally spaced apart longerons, a spirally formed continuous rib enclosing the longerons, means connecting the longerons and the rib at cross-over contacting areas, a fixed keel within the fuselage section, a deck slidably positioned upon the keel, an aft bulkhead for the fuselage section having its peripheral portion behind the coiled rib, and having a sliding connection with the keel and longerons, means connecting the deck with the bulkhead, and a passenger seating arrangement mounted on the deck.

2. In a fuselage section the combination of a plurality of longitudinally extending, laterally spaced apart longerons, section connecting end rings surrounding and connected to the respective ends of the longerons, a spirally formed continuous rib enclosing the longerons, means connecting the end coils of the rib to the rings, means connecting the longerons and the rib at cross-over contacting areas, a fixed keel within the fuselage section, a deck slidably positioned upon the keel, an aft bulkhead for the fuselage section positioned rearwardly of the rear ring and having its peripheral portion positioned behind the coiled rib and having a sliding connection with the keel and longerons, means connecting the rear deck portion with the aft bulkhead of the section, and a passenger seating arrangement mounted on the deck.

3. In a fuselage section the combination of a plurality of longitudinally extending, laterally spaced apart longerons, section connecting end rings surrounding and connected to the respective ends of the longerons, a spirally formed continuous rib enclosing the longerons, means connecting the end coils of the rib to the rings, means connecting the longerons and the rib at crossover contacting areas, a fixed keel within the fuselage section, a deck slidably positioned upon the keel, an after bulkhead for the fuselage section positioned rearwardly of the rear ring and having its peripheral portion positioned behind the coiled rib and having a sliding connection with the keel and longerons, means connecting the rear deck portion with the aft bulkhead of the section, a sectionalized floor upon the deck, said floor having a number of plates connected together by laterally extending crimped seams, a lateral row of passenger seats mounted on each plate, and a connection between the rearmost plate and the bulkhead.

References Cited
UNITED STATES PATENTS

| | | | |
|---|---|---|---|
| 1,313,689 | 8/1919 | Henderson | 244—119 |
| 1,818,423 | 8/1931 | Mummert | 244—119 |
| 2,082,675 | 6/1937 | Allen | 244—125 |

MILTON BUCHLER, *Primary Examiner.*

T. W. BUCKMAN. *Assistant Examiner.*